United States Patent
Hanschke et al.

(10) Patent No.: US 9,786,936 B2
(45) Date of Patent: Oct. 10, 2017

(54) METHOD FOR SUPPLYING AIR TO A FUEL CELL

(71) Applicant: Daimler AG, Stuttgart (DE)

(72) Inventors: Jonas Hanschke, Stuttgart (DE); Sven Schmalzriedt, Esslingen (DE)

(73) Assignee: Daimler AG, Stuttgart (DE)

( * ) Notice: Subject to any disclaimer, the term of this patent is extended or adjusted under 35 U.S.C. 154(b) by 206 days.

(21) Appl. No.: 14/427,186

(22) PCT Filed: Sep. 10, 2013

(86) PCT No.: PCT/EP2013/002704
§ 371 (c)(1),
(2) Date: Mar. 10, 2015

(87) PCT Pub. No.: WO2014/040721
PCT Pub. Date: Mar. 20, 2014

(65) Prior Publication Data
US 2015/0244012 A1    Aug. 27, 2015

(30) Foreign Application Priority Data

Sep. 13, 2012 (DE) .......... 10 2012 018 102

(51) Int. Cl.
*H01M 8/04* (2016.01)
*H01M 8/04746* (2016.01)
(Continued)

(52) U.S. Cl.
CPC ... *H01M 8/04753* (2013.01); *H01M 8/04089* (2013.01); *H01M 8/04201* (2013.01);
(Continued)

(58) Field of Classification Search
CPC .......... H01M 8/04753; H01M 8/04201; H01M 8/04395; H01M 8/04089; H01M 8/04619; H01M 8/0441; H01M 8/04335
See application file for complete search history.

(56) References Cited

U.S. PATENT DOCUMENTS

| | | | |
|---|---|---|---|
| 5,991,670 A | 11/1999 | Mufford | |
| 2005/0139399 A1* | 6/2005 | Gopal | B60L 11/1887 180/65.1 |

(Continued)

FOREIGN PATENT DOCUMENTS

| DE | 102006058833 A1 | 8/2007 |
|---|---|---|
| DE | 102007046058 A1 | 4/2008 |

(Continued)

OTHER PUBLICATIONS

International Search Report in International Application No. PCT/EP2013/002704 dated Jan. 17, 2014.
(Continued)

*Primary Examiner* — Ula C Ruddock
*Assistant Examiner* — Matthew Van Oudenaren
(74) *Attorney, Agent, or Firm* — Patent Central LLC; Stephan A. Pendorf

(57) ABSTRACT

A method for supplying air to a fuel cell (2), using a controllable air conveying device (7) which delivers an air mass flow for a cathode chamber (4) of the fuel cell (2), and using at least one air mass flow sensor (9, 18). The invention is characterized in that, for at least one location (19) in the air flow path which is situated at a distance from the at least one air mass flow sensor (9) in the flow direction, a computed estimate is made of the air mass flow present at that location.

7 Claims, 1 Drawing Sheet

(51) Int. Cl.
*H01M 8/04089* (2016.01)
*H01M 8/0438* (2016.01)
*H01M 8/04082* (2016.01)
*H01M 8/0432* (2016.01)
*H01M 8/04537* (2016.01)

(52) U.S. Cl.
CPC ...... *H01M 8/04395* (2013.01); *H01M 8/0441* (2013.01); *H01M 8/04335* (2013.01); *H01M 8/04619* (2013.01); *H01M 2250/20* (2013.01); *Y02T 90/32* (2013.01)

(56) References Cited

U.S. PATENT DOCUMENTS

| | | |
|---|---|---|
| 2007/0141412 A1 | 6/2007 | Becker et al. |
| 2008/0081225 A1 | 4/2008 | Arthur et al. |
| 2009/0155651 A1 | 6/2009 | Orihashi |
| 2011/0223499 A1 | 9/2011 | Gottwick et al. |
| 2012/0015270 A1 | 1/2012 | Naganuma |

FOREIGN PATENT DOCUMENTS

| | | |
|---|---|---|
| DE | 102008043740 A1 | 5/2010 |
| JP | 2006324213 A | 11/2006 |
| JP | 2010251149 A | 11/2010 |
| WO | 2011013226 A1 | 2/2011 |
| WO | 2011051767 A1 | 5/2011 |

OTHER PUBLICATIONS

Office Action dated Jan. 26, 2016, in Japanese Patent Application No. 2015-531486.

* cited by examiner

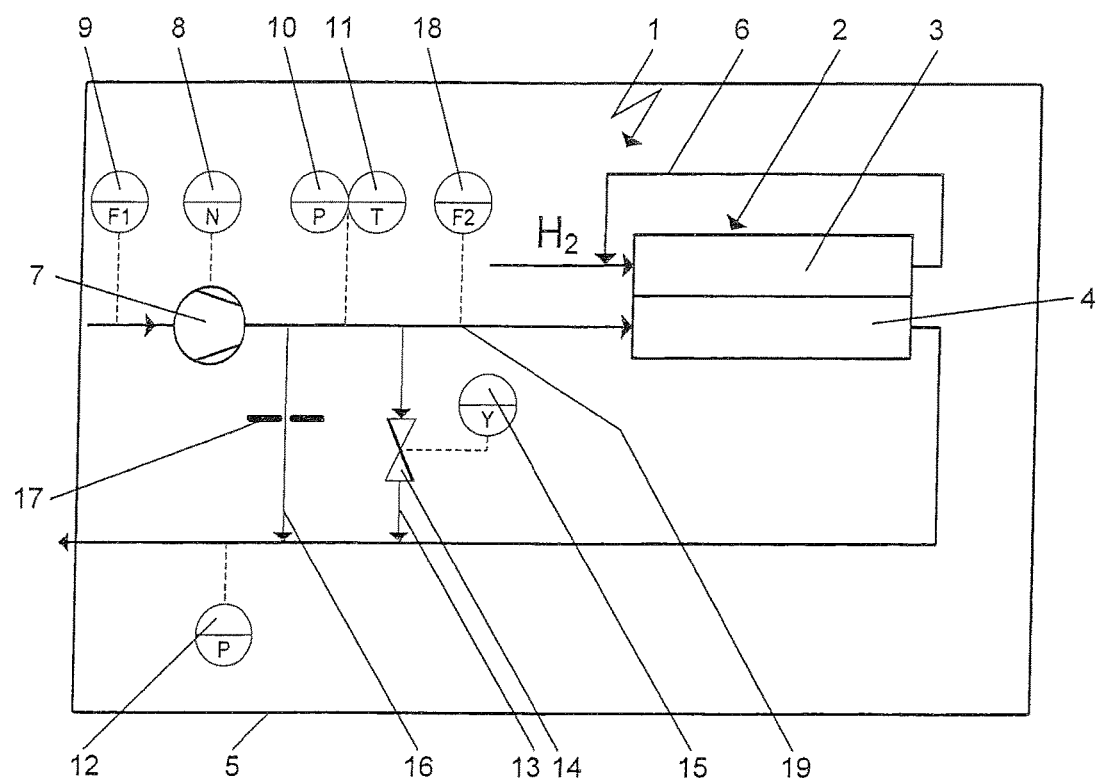

METHOD FOR SUPPLYING AIR TO A FUEL CELL

The invention relates to a method for supplying air to a fuel cell of the type defined in greater detail in the preamble of claim 1. The invention further relates to the use of such a method.

Methods for supplying air to a fuel cell in a fuel cell system are known from the general prior art. Controllable air conveying devices are typically used which, for example, may be regulated with respect to their rotational speed in such a way that the required quantity of air, i.e., the air mass, for the fuel cell may thus be set. In particular in automotive applications of fuel cell systems, it is generally known and customary to use an air mass flow sensor or air mass meter. Such air mass flow sensors are also generally known and customary in automotive applications with internal combustion engines. By use of these sensors, the air mass flow may be measured, and when used in a fuel cell system in a closed control loop, may be appropriately adjusted by means of the air supply device.

The air mass flow sensors known from automotive technology are typically designed for internal combustion engines. They are comparatively expensive, and, due to the differing requirements of an internal combustion engine and a fuel cell, are not necessarily optimized for supplying air to the fuel cell in all operating points which occur. This is particularly true when the air mass flow sensors are used downstream from the air conveying device in the flow direction. The inventors have found that enormous problems frequently arise when air mass flow sensors are used downstream from the air conveying device in the air flow direction, and that these air mass [flow] sensors are very prone to malfunction. This is bothersome during the operation of a vehicle, since a malfunction of the air mass flow sensor at this location often results in a failure of the entire vehicle system.

In addition to the use of air mass flow sensors, as an alternative to using an air mass flow sensor it is known from the prior art to correspondingly compute the quantity of air, so that the air mass flow sensor may be dispensed with entirely. DE 10 2008 043 740 A1 is cited as an example in this regard.

Another problem which arises in particular in fuel cells, i.e., in the supply of air to fuel cells, is that different air mass flows occur at various locations in the so-called air flow path in the fuel cell system. This may be caused in particular by leaks and auxiliary users, as well as so-called system bypass lines which allow a connection of the feed air path for the fuel cell to the exhaust air path of the fuel cell in order to cause conveyed feed air to flow past the fuel cell under certain operating situations. In order to still detect the appropriate values at all locations at which an exact knowledge of the air mass flow is necessary, it would be fairly self-evident to increase the number of air mass flow sensors and to place one air mass flow sensor at each of the required locations. However, due to the comparatively costly sensors and their limited functionality for fuel cell systems, this entails significant added costs, and still does not allow secure, reliable measurement of the air mass values in all operating situations.

The object of the present invention is to provide a method for supplying air to a fuel cell which avoids the mentioned disadvantages and offers a simple, secure, and reliable option for supplying air to a fuel cell.

In the method according to the invention, it is provided that at least one air mass flow sensor is situated in the air flow path for supplying air to the fuel cell. According to the invention, for at least one location in the air flow path which is situated at a distance from the at least one (first) air mass flow sensor in the flow direction, a computed estimate is made of the air mass flow present at that location. The method according to the invention meets the requirement that a reliable value for the air mass flow is frequently required at at least two different locations within an air flow path of the fuel cell system. As the result of installing only one air mass flow sensor, and at the other location allowing a computed estimation of the value of the air mass flow, an additional air mass flow sensor may be dispensed with. This may be meaningful in particular when the other location at which knowledge of the air mass flow is necessary is situated in an area which is unsuitable for measuring the air mass flow by means of an air mass flow sensor. Additionally or alternatively, when multiple air mass flow sensors are present, the method according to the invention may still be used, in which case the measured value that is generated by the, or the additional, air mass flow sensors by means of the computed estimation is checked for plausibility, so that secure, reliable functionality of the additional air mass flow sensor may be monitored.

In one very advantageous embodiment of the method according to the invention, it is provided that the at least one (first) air mass flow sensor is situated upstream from an air conveying device in the flow direction. By use of such a design in which the air mass flow sensor is situated upstream from the air conveying device, comparatively high reliability of the measured value of the air mass flow sensor may be attained, since the inventors have found that air mass flow sensors in fuel cell systems operate more reliably and for a longer period of time at this location than downstream from the air conveying device. This means that air mass flow sensors situated downstream from the air conveying device in the flow direction are much more vulnerable than those situated upstream. As a result of the method according to the invention, it is now possible to generate a very reliable measured value, using an air mass flow sensor situated upstream from the air conveying device, in order to appropriately estimate the air mass flow at other locations in the air flow path, in particular at locations downstream from the air conveying device, by means of a computed estimation.

In one particularly favorable and advantageous refinement of the method according to the invention, it is provided that only one air mass flow sensor is used. The use of this one air mass flow sensor, and the computed estimation of the value of the air mass flow in the area of one or more other locations at which accurate knowledge of the value of the air mass flow is necessary, results in a very simple and efficient design which is cost-effective and, for a suitable arrangement of the air mass flow sensor, for example upstream from the air conveying device in the flow direction, very durable and reliable.

In one alternative embodiment of the method according to the invention, however, it may also be provided that an additional air mass flow sensor is situated in the area of at least one of the locations at which the air mass flow is estimated. In principle, the air mass flow in the area of this location may then be measured for this additional air mass flow sensor. According to one particularly advantageous refinement of the concept according to the invention, the computed estimation of the air mass flow present at that location, also carried out according to the method according to the invention, now allows functional monitoring of the additional air mass flow sensor by comparing the computed estimation and the measured value of the additional air mass flow sensor. The secure and reliable functioning of the additional air mass flow sensor is thus monitored and ensured, wherein in the event of a malfunction, further operation is possible based on the values obtained by the computed estimation. However, a warning device, for example, may be activated and switched on so that the defective air mass flow sensor may be replaced promptly. Meaningful, reliable operation may still take place via the value which is estimated by computation.

In one particularly advantageous refinement of this embodiment of the method according to the invention, it may also be provided that, depending on the operating situation of the fuel cell, the value of the computed estimation or the measured value of the additional air mass flow sensor is taken into account as the actual variable in the control. This design is of significant advantage in particular when the additional air mass flow sensor is situated downstream from the air conveying device in the flow direction, and the first air mass flow sensor is situated upstream from such an air conveying device in the flow direction. Downstream from the air conveying device, the measurement is greatly dependent on the operating conditions of the fuel cell system. In such situations in which the functionality of the additional air mass flow sensor is known to be limited, an appropriate switch may then be made via an operational control of the fuel cell system for which these situations are known and which are determined, for example, from different measured values of pressures, temperatures, electrical power, and the like. This ensures that in situations in which good functionality of the air mass flow sensor is provided from experience, the measured values are used, and in situations in which this is not the case, the values estimated by computation are used. At the same time, in particular in the situations in which the measured values are used, the measured values may be checked for plausibility via the computed estimation, thus ensuring secure and reliable functionality of the additional air mass flow sensor.

Furthermore, it is also possible in these situations to make an adaptive adjustment of the computed estimation by a continuous alignment of the measured values with the values obtained by computed estimation, so that the computed estimation over the operating period of the fuel cell or of the fuel cell system becomes increasingly better and may respond to gradual changes, for example due to aging and wear, for example in the area of the bearings of the air conveying device, in the area of the seals, or the like, and secure and reliable functionality over the long term is ensured.

In one advantageous refinement of the concept according to the invention, it is provided that the computed estimation is made on the basis of models and/or characteristic maps. Such an estimation may be made, for example, via measured data of certain operating situations of the fuel cell system which are stored in characteristic maps, and taking into account various measured values of sensors in the fuel cell system, which are present anyway, by using the values stored in the characteristic maps. Additionally or alternatively, the use of simulation computations or simulation models is meaningful and possible, thus allowing a comparatively exact and reliable dynamic estimation of the air mass flow at the location situated at a distance from the at least one first air mass flow sensor.

In one very advantageous refinement thereof, it is provided that at least one of the following variables is included in the computed estimation. These variables are in particular:

Rotational speed and/or power consumption of the air conveying device;
Pressure and/or temperature at one or more locations in the air flow path;
Position of a valve unit in the air flow path;
Position of a valve unit in a system bypass;
Ambient temperature;
Temperature of the fuel cell;
Composition of the air mass flow;
Operating state and/or instantaneous electrical power of the fuel cell;
Moisture in the feed air; and/or
Losses via leaks in the air flow path.

These variables are typically detected anyway in the fuel cell system, since temperatures and pressures in particular are easy to detect, and in any case are necessary for regulating and controlling the fuel cell system. The same applies for the detection of electrical variables such as current and voltage, power of the fuel cell, and the like. These variables all have a fairly great influence on the computed estimation of the air mass flow at the location situated at a distance from the at least one (first) air mass flow sensor, and are included in this type of computation, or, if the computation is not carried out or is carried out only via a model-based simulation computation, the variables, for example the rotational speed of the air conveying device, the power which it consumes, or the like, are also taken into account via appropriate characteristic maps.

The necessity for the best possible air supply together with a mass of the air flow conveyed to the fuel cell which is adapted as precisely as possible to the needs of the fuel cell play a role in particular in fuel cell systems which are operated in a highly dynamic manner, i.e., which have a frequent change in the required power or the required air supply. Such systems are in particular fuel cell systems used in vehicles. In vehicles there is typically a very dynamic power requirement, in particular when the power is utilized, at least in part, as drive power for the vehicle. The preferred use of the method according to the invention for supplying air to a fuel cell is therefore in the use of the air supply to a fuel cell in a fuel cell system which delivers electrical power, in particular electrical drive power, for a vehicle. Such a vehicle may in particular be a trackless land vehicle, or also a rail vehicle or a watercraft. The use of the fuel cell system for the on-board power supply in an aircraft is also encompassed by the definition according to the invention of a fuel cell system which delivers electrical power to a vehicle.

Further advantageous embodiments of the method according to the invention for supplying air to a fuel cell result from the other dependent claims, and become clear from the exemplary embodiment described below, which is explained in greater detail with reference to the FIGURE.

The single appended FIGURE shows a detail of a fuel cell system for carrying out the method according to the invention in one possible embodiment.

A relevant detail of a fuel cell system 1 for carrying out the method described below is apparent in the illustration in the single appended FIGURE. The fuel cell system essentially comprises a fuel cell 2 which has an anode chamber 3 and a cathode chamber 4. The fuel cell 2 itself is intended to have a design as a stack of PEM fuel cells. In the exemplary embodiment illustrated here, the fuel cell system 1 is designed to deliver electrical drive power for a motor vehicle, which is indicated by way of example by the box denoted by reference numeral 5. Since the hydrogen supply to the anode chamber 3 of the fuel cell 2 does not play a significant role in the present invention, supplying of hydrogen (H$_2$) is indicated strictly as an example. The hydrogen may be recirculated into the anode chamber 3 of the fuel cell 2, for example in a circuit denoted by reference numeral 6. Generally customary components such as recirculation conveying devices or valves for discharging water and/or gases in the circuit 6 are not illustrated, but of course may be present. The cathode chamber 4 of the fuel cell 2 is supplied with air as the oxygen supplier via an air conveying device 7. To ensure an ideal air supply or oxygen supply to the cathode chamber 4 of the fuel cell 2 in any situation, the rotational speed of the air conveying device 7, which may be designed as a flow compressor, for example, is regulated in such a way that the desired air mass flow or oxygen mass flow results. The regulation of the air conveying device 7 or its rotational speed N is taken over by a control electronics system, not illustrated. The rotational speed N of the air conveying device 7 is known from the regulation of the air conveying device 7 or is detected via a suitable sensor, provided with reference numeral 8 in the illustration in the FIGURE. The air mass flow upstream from the air conveying device 7 is measured in a manner known per se via an air mass flow sensor 9, denoted in principle by reference character F1. Examples of further relevant sensors include a sensor 10 for the pressure P, a sensor 11 for the temperature T, and an additional sensor 12 which likewise measures the pressure P, but at a different location within the so-called air flow path of the fuel cell system 1.

As is frequently customary in fuel cell systems 1 at the present time, a so-called system bypass 13 having a controllable bypass valve 14 is situated between the feed air path to the cathode chamber 4 of the fuel cell 2 and the exhaust air flow path from the cathode chamber 4 of the fuel cell 2. The instantaneous position Y of the valve unit 14 is known, either from the regulation of the bypass valve 14 or via a sensor 15 indicated here in principle, and is available for the system control. In addition to these components within the fuel cell system 1 or its air flow path which are customarily present, a line 16 together with a diaphragm 17 are also indicated in the illustration in the FIGURE. This line 16 together with the diaphragm 17 are intended to symbolize a leak, which in actual systems is typically unavoidable. Air escapes from the feed air path via such an uncontrolled leak. Neither the leak via the line 16 nor the system bypass line 13 has to open into the exhaust air line of the air flow path in order to fulfill its functionality. They may also release to the environment, which in particular for the leaks indicated here only in principle is also the case in the normal situation.

Due to the described design, the leaks in the system bypass, and the like, it is not possible to exactly predict the air mass flowing into the cathode chamber 4 based on the values which are measured by the air mass flow sensor 9. For this reason, an additional air mass flow sensor 18, which in the exemplary embodiment illustrated here is to be understood as optional, is typically provided in the air flow path at a distance from the air mass flow sensor 9. Nevertheless, for the secure and reliable operation of the fuel cell system it is necessary to know the air mass flow at the location denoted by reference numeral 19, in which area the air mass flow sensor 18 is situated. In addition to the complicated, costly use of two air mass flow sensors 9, 18 and due to the fact that the air mass flow sensor 18 is very prone to incorrect measurements and malfunctions in the area downstream from the air conveying device 7, it is now provided that the value of the air mass flow in the area of the location 19 is determined via a computed estimation in the method for supplying air to the fuel cell 2. As the result of this computed estimation of the value of the air mass flow in the area of the location 19, either the second air mass flow sensor 18 may be dispensed with entirely, or, if it is already present, its functionality may be monitored to be able to quickly, securely, and reliably detect a possible failure or malfunction. Up to the point of a possible replacement of this second air mass flow sensor 18, the operation of the fuel cell system 1 or of the vehicle 5 may then be maintained based on the value which is determined via the computed estimation, so that any harm to the user of the vehicle 5 may be limited.

The computed estimation is carried out in part via characteristic maps and/or via a model-based simulation, wherein in any case variables which are available anyway, such as the rotational speed N, pressures P, temperatures T, and in particular the position Y of the valve unit 14 in the system bypass 13, are also taken into account. A very secure and reliable computed estimation of the air mass flow present in the area of the location 19 may thus be made, taking into account these measured values which are present anyway, and the estimation of uncontrollable leaks, for example based on an operating point of the fuel cell 2, the overall air mass flow conveyed, the electrical power instantaneously delivered by the fuel cell 2, or the like. Secure and reliable functionality is thus always ensured when the second air mass flow sensor 18, for example, is not present, has failed, or delivers very inaccurate, unacceptable measured values due to operating conditions of the fuel cell 2 which are disadvantageous for the second air mass flow sensor. In this case, even when an additional air mass flow sensor 18 is present and properly functioning in principle, it is possible to use the values of the computed estimation in order to maintain the operation of the fuel cell 2 in the desired manner and eliminate system-related inaccuracies in the measurement by the additional air mass flow sensor 18. Overall, very secure and reliable operation is thus achieved, with a simple design and long service life of the sensors 9, 18 used.

The invention claimed is:

1. A method for supplying air to a fuel cell (2), comprising delivering an air mass flow to a cathode chamber (4) of the fuel cell (2) using a controllable air conveying device (7),
    providing a first air mass flow sensor (9) upstream of the controllable air conveying device (7),
    providing a second air mass flow sensor (18) downstream of the controllable air conveying device (7) and upstream of the cathode chamber (4),
    measuring air mass flow via the first air mass flow sensor (9) and outputting a first air mass flow value,
    measuring air mass flow via the second air mass flow sensor (18) and outputting a second air mass flow measured value,
    computing, independent of the second air mass flow sensor (18), an estimate of the air mass flow for the location (19) of the second air mass flow sensor (18) to provide a computed estimation, and
    monitoring the function of the second air mass flow sensor (18) by means of comparison of the computed estimation and the second air mass flow sensor (18) measured value.

2. A method for supplying air to a fuel cell (2), comprising delivering an air mass flow to a cathode chamber (4) of the fuel cell (2) using a controllable air conveying device (7),
    providing a first air mass flow sensor (9) upstream of the controllable air conveying device (7), providing a second air mass flow sensor (18) downstream of the controllable air conveying device (7) and upstream of the cathode chamber (4), measuring air mass flow via the first air mass flow sensor (9) and outputting a first air mass flow value, measuring air mass flow via the second air mass flow sensor (18) and outputting a second air mass flow measured value, computing, independent of the second air mass flow sensor (18), an estimate of the air mass flow for the location (19) of the second air mass flow sensor (18) to provide a computed estimation, and monitoring the function of the second air mass flow sensor (18) by means of comparison of the computed estimation and the second air mass flow sensor (18) measured value, and in the event that the second air mass flow sensor (18) is determined to be functional, taking into account the measured value of the second air mass flow sensor (18) as the actual variable in controlling the air mass flow, and in the event that the second air mass flow sensor (18) is determined to be non-functional, taking into account the value of the computed estimation as the actual variable in controlling the air mass flow.

3. A method for supplying air to a fuel cell (2), comprising delivering an air mass flow to a cathode chamber (4) of the fuel cell (2) using a controllable air conveying device (7), providing a first air mass flow sensor (9) upstream of the controllable air conveying device (7), providing a second air mass flow sensor (18) downstream of the controllable air conveying device (7) and upstream of the cathode chamber (4), measuring air mass flow via the first air mass flow sensor (9) and outputting a first air mass flow value, measuring air mass flow via the second air mass flow sensor (18) and outputting a second air mass flow measured value, computing, independent of the second air mass flow sensor (18), an estimate of the air mass flow for the location (19) of the second air mass flow sensor (18) to provide a computed estimation, and monitoring the function of the second air mass flow sensor (18) by means of comparison of the computed estimation and the second air mass flow sensor (18) measured value, and in the event that the second air mass flow sensor (18) is determined to be non-functional, the monitoring indicates a defective second air mass flow sensor, the computed estimation is taken into account as the actual variable in controlling the air mass flow.

4. The method according to claim 1, wherein the computed estimation is made on the basis of models and/or characteristic maps.

5. The method according to claim 1, wherein at least one of the following variables is included in the computed estimation:

Rotational speed (N) and/or power consumption of the air conveying device (7);

Pressure (P) and/or temperature (T) at one or more locations in the air flow path;

Position (Y) of a valve unit in the air flow path;

Position of a valve unit (14) in a system bypass (13);

Ambient temperature;

Temperature of the fuel cell (2);

Composition of the air mass flow;

Operating state and/or instantaneous electrical power of the fuel cell (2);

Moisture in the feed air; and/or

Losses via leaks in the air flow path.

6. The method according to claim 1, wherein air is supplied to a fuel cell (2) in a fuel cell system (1) which delivers electrical power for a vehicle (5).

7. The method according to claim 1, wherein air is supplied to a fuel cell (2) in a fuel cell system (1) which delivers electrical drive power which is used at least in part as drive power for a vehicle (5).

* * * * *